US007823027B2

(12) United States Patent  
Itozawa et al.

(10) Patent No.: US 7,823,027 B2  
(45) Date of Patent: Oct. 26, 2010

(54) DATA PROCESSING MANAGEMENT APPARATUS, MODE MANAGEMENT APPARATUS AND MODE MANAGEMENT METHOD

(75) Inventors: Shintarou Itozawa, Kawasaki (JP); Takayuki Kinoshita, Kawasaki (JP); Junji Ichimiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 11/741,993

(22) Filed: Apr. 30, 2007

(65) Prior Publication Data

US 2008/0046629 A1    Feb. 21, 2008

(30) Foreign Application Priority Data

Aug. 18, 2006    (JP)    ............... 2006-223663

(51) Int. Cl.  
    *G06F 11/00*    (2006.01)
(52) U.S. Cl. .......................... 714/43; 714/56
(58) Field of Classification Search ............... 714/43, 714/56, 44; 710/15, 7, 62, 10, 316, 317  
    See application file for complete search history.

(56) References Cited

U.S. PATENT DOCUMENTS

| 4,627,054 | A | | 12/1986 | Cooper et al. | |
| 4,644,353 | A | * | 2/1987 | Wei | 340/14.6 |
| 5,319,639 | A | * | 6/1994 | Guha | 370/427 |
| 5,754,865 | A | | 5/1998 | Itskin et al. | |
| 6,195,351 | B1 | | 2/2001 | Hiscock et al. | |
| 6,871,294 | B2 | * | 3/2005 | Phelps et al. | 714/5 |
| 6,986,249 | B2 | * | 1/2006 | Bernard | 60/571 |
| 2005/0210171 | A1 | * | 9/2005 | Tanaka et al. | 710/74 |
| 2006/0109782 | A1 | | 5/2006 | Ra et al. | |

FOREIGN PATENT DOCUMENTS

| EP | 0 961 442 | 12/1999 |
| GB | 2 333 931 | 8/1999 |
| JP | 7-82479 | 9/1995 |
| JP | 9-179838 | 7/1997 |

OTHER PUBLICATIONS

Extended European Search Report, mailed Nov. 30, 2007 and issued in corresponding European Patent Application No. 07106998.3-2416.  
Korean Office Action issued on Apr. 27, 2009 in corresponding Korean Patent Application 10-2007-0049764.  
Office Action dated Sep. 5, 2008 and issued in corresponding Chinese Patent Application No. 2007101041704.

* cited by examiner

*Primary Examiner*—Dieu-Minh Le  
(74) *Attorney, Agent, or Firm*—Fujitsu Patent Center (57) ABSTRACT

A configuration is such as to change a mode setup of other crossbars influenced by an error occurring in one of plural crossbars from a first mode to a second mode for operating each of them independently (i.e., in a singularization mode) in the case of placing plural crossbars (i.e., crossbar units) for connecting incorporated units (i.e., processing units) and operating the plural crossbars in the first mode (i.e., a dualized mode) for dualizing them, thereby continuing an operation of a system by using a normally operable part when an error occurs in a part of the system.

4 Claims, 10 Drawing Sheets

| | ERROR RANGE | SINGULARIZED SETTING | DUALIZED SETTING |
|---|---|---|---|
| AT ERROR OCCURRENCE | UNIT OF PARTITION | PROCESS OF SHUTTING DOWN ONLY THE APPLICABLE PARTITION. REPORT TO THE MANAGEMENT BOARD AND SHUT DOWN THE APPLICABLE PARTITION | REPORT, TO THE MANAGEMENT BOARD, AN ERROR IN THE UNIT OF PARTITION AS ERROR IN THE SAME LEVEL AS ONE RELATED TO THE ENTIRETY OF THE SYSTEM |
| | ENTIRE SYSTEM | REPORT TO THE MANAGEMENT BOARD AND SHUT DOWN ALL PARTITIONS | REPORT TO THE MANAGEMENT BOARD |
| SYSTEM OPERATION AFTER ERROR REPORT | UNIT OF PARTITION | CONTINUE TO OPERATE A PARTITION UNRELATED TO THE ERROR | · WHEN TWO ADDRESS CROSSBARS OPERATING: STOP OPERATING THE FAILED ADDRESS CROSSBAR<br>· WHEN ONE ADDRESS CROSSBAR OPERATING (AFTER THE OTHER FAILED) STOP THE SYSTEM EVEN IF AN ERROR IN THE UNIT OF PARTITION<br>→ CONTINUE TO BE OPERABLE IF IT IS A SINGULARIZED SETUP |
| | ENTIRE SYSTE | SHUT DOWN ALL PARTITIONS | SAME AS ABOVE |

DATA PROCESSING MANAGEMENT APPARATUS, MODE MANAGEMENT APPARATUS AND MODE MANAGEMENT METHOD

CROSS REFERENCE TO RELATED APPLICATIONS

The present application claims priority to Japanese Patent Application 2006-223663 filed Aug. 18, 2006, the entire contents of which are hereby incorporated herein by reference.

BACKGROUND OF THE INVENTION

1. Field of the Invention

The present invention relates to a data processing apparatus configuring a unit for enabling a connection of a system board equipped with one or more central processing unit (CPU) and an input/output (IO) unit for connecting a peripheral apparatus.

2. Description of the Related Art

Recent years have been witnessing some computers (i.e., data processing apparatuses) configured to enable an incorporation of a plurality of physically separate units. Such units usually include a system board (SB) equipped with a CPU and memory, and an IO unit equipped with IO devices such as a hard disk apparatus and a peripheral component interconnect (PCI) slot. The reason for providing such a unit is to allocate a CPU resource and a memory resource flexibly in response to a condition. That is, to gain advantage of utilizing these resources effectively. A computer that is configured as such is equipped with one or more of the system boards and IO units, respectively. A crossbar is used for interconnecting these units. Such configured computer allows a division into one or more system ports and IO units, respectively, as one independent system. Such a dividable "independent system" is called a "partition".

Figure 1:
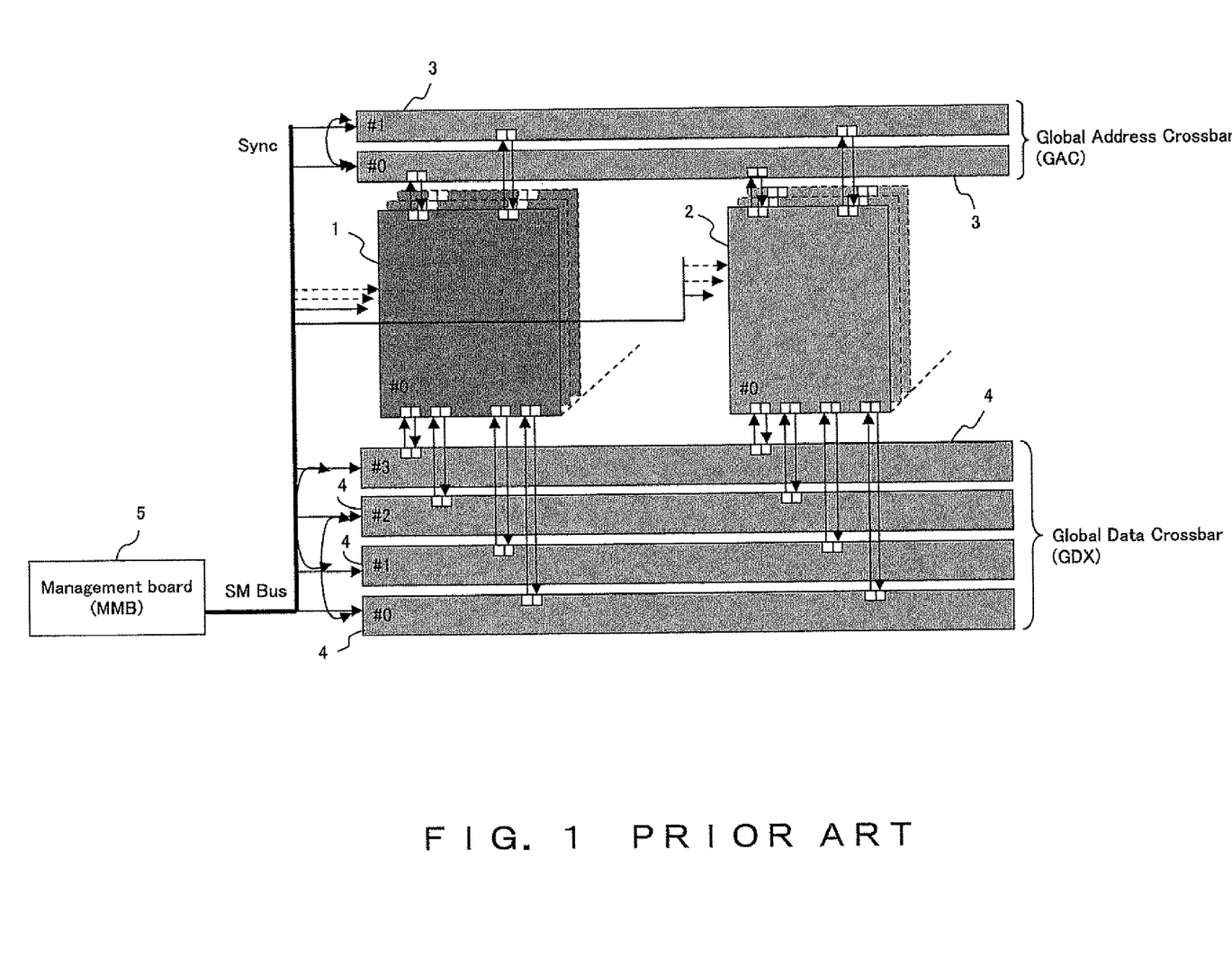
FIG. 1 is a diagram showing a configuration of a computer to which plural units are connected by employing crossbars.

FIG. 1 is a diagram showing a configuration of a computer connecting a plurality of units by a crossbar. As shown in FIG. 1, one or more system boards 1 and IO units 2 are both connected to two global address crossbars (abbreviated as "address crossbar" or "GAC" hereinafter) 3 and four global data crossbars (abbreviated as "data crossbar" or "GDX" hereinafter) 4, respectively. A management board (MMB) 5 is a dedicated management unit that is connected to each of the units 1 through 4 by way of SM bus.

The two address crossbars 3 carry out the same request controls simultaneously, thereby dualizing the address crossbars in terms of hardware, thus accomplishing a high reliability. This specification calls an operation mode for dualization as "dualization mode" for convenience. The reason for providing the four data crossbars 4 is that a large volume of data is transmitted at once.

Incidentally, "#0" and "#1" are noted on the two address crossbars 3, respectively. Therefore, when addressing only one of the two crossbars 3, "#0" or "#1" will be attached to the component number. This method of notation is the same for other component addresses herein.

The two crossbars 3 operate synchronously with each other. As for the data crossbars 4, the two data crossbars 4#0 and 4#2, two data crossbars 4#1 and 4#3 operate synchronously with each other, respectively.

Mechanisms for storing data and control information, such as memory, buffer, and queue mounted on the address crossbars 3 are configured to add an Error Correcting Code (ECC) or parity, thereby recognizing an occurrence of an uncorrectable error. Also configured is to recognize an error occurrence such as a freeze by monitoring an operation of other parts. In the case of an error occurrence during an operation in a dualization mode, a conventional computer is configured to respond to as described in the following.

Figure 2:
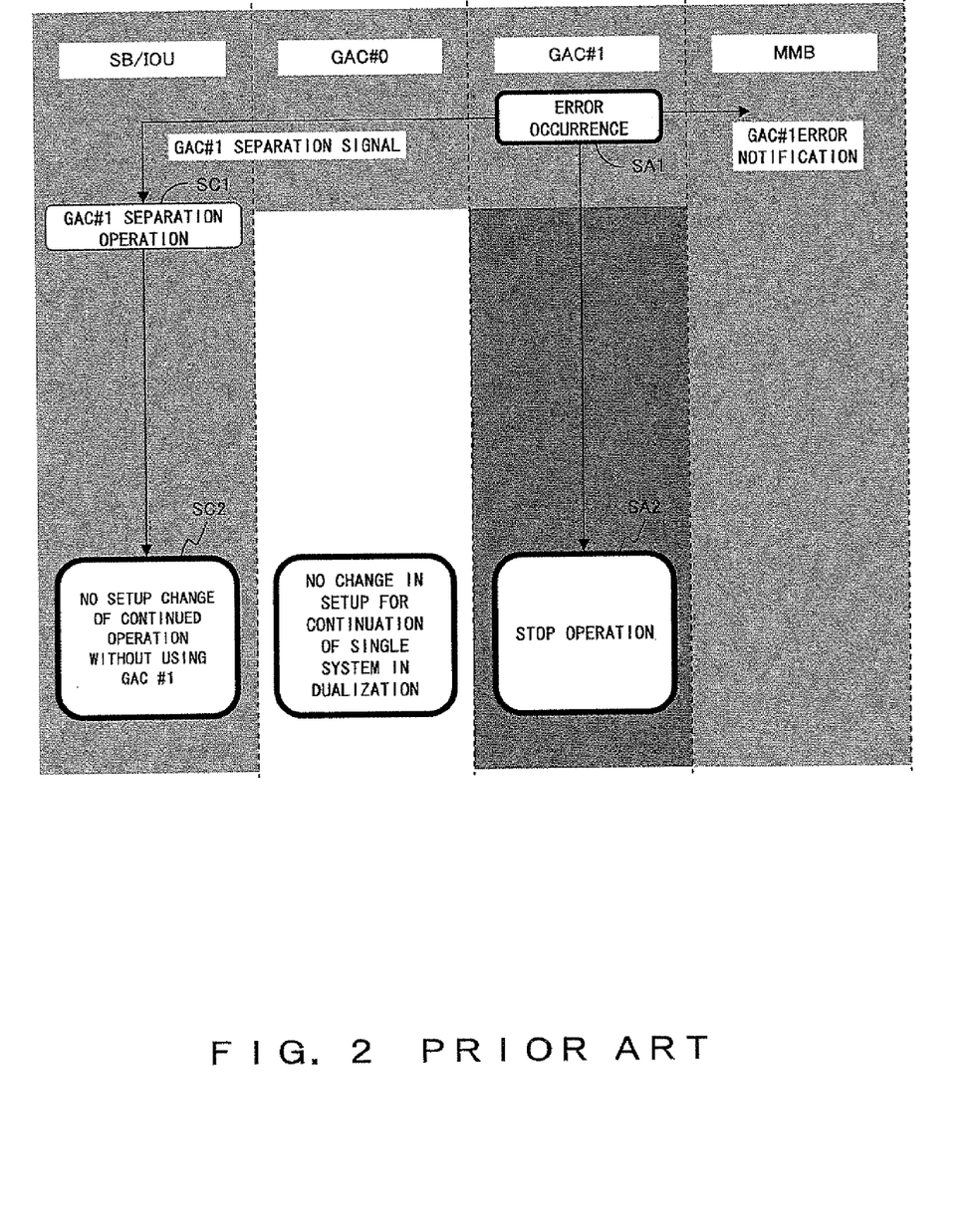
FIG. 2 is a flow chart showing a flow of process carried out by a conventional computer when an error occurs in an address crossbar 3#1.

FIG. 2 is a flow chart showing a flow of process carried out by the respective parts of a conventional computer in the case of an error occurring in the address crossbar 3#1. The next is a specific description on an operation of individual parts including the crossbar 3#1, in which the error has occurred, by referring to FIG. 2. The individual parts are divided into four parts, i.e., a system board 1 and IO unit 2 (noted as "SB/IOU" in the drawing), an address crossbar 3#0 (noted as "GAC #0" in the drawing), an address crossbar 3#1 (noted as "GAC 3#1" in the drawing) and a management board 5 (noted as "MMB" in the drawing) according to the configuration shown by FIG. 2.

Recognizing (i.e., detecting) an error occurrence, the address crossbar 3#1 notifies the management board 5, each system board 1 and each IO unit, respectively, of the error occurrence (step SA 1; likewise noted hereinafter). The address crossbar 3#1 transmits a signal (i.e., a GAC separation signal) to each system board 1 and each IO unit 2 requesting for logically separating the address crossbar 341 from the system, followed by stopping an operation (SA 2).

Having received the GAC separation signal, each system board 1 and each IO unit 2 respectively carry out an operation (i.e., process) of separating the address crossbar 3#1 in which the error has occurred (SC 1). The same operation continues thereafter except for not using the separated crossbar 3#1 (SC 2).

The management board 5 reflects the notification to the system control, including making the other address crossbar 3#0 continue the same operation as prior to the error occurrence by not notifying it of the error occurrence in the address crossbar 3#1.

As such, when an error occurs in one of the dualized address crossbars 3, the error-occurred address crossbar 3 is no longer used, and thus being separated from the system. This is in consideration of maintaining a reliability of data. Accordingly, the configuration is such that an address crossbar 3 operating in a dualization mode is made to stop operating at an error occurrence (refer to FIG. 2) therein.

The dualization of the address crossbar 3 achieves a higher level of reliability. If an error occurs in one of the two address crossbars 3, the system can be operated by using the other crossbar 3. There is, however, a possibility of an error occurrence in the other as well. If such an error occurs, the other is also stopped by the error occurrence, resulting in a system stoppage.

Some of errors occurring in the address crossbar 3 may not necessarily have to stop the crossbar 3 per se. There is many a case of an occurrence of partial error influencing only between specific units. Therefore, in the case of setting a mode operating a unit independently (notes as "singularized mode" hereinafter), the configuration is such as to operate a part uninfluenced by an error occurrence, and stop only a part necessary to stop due to the error occurrence. In order to achieve a higher availability of the system, it is also conceivably important to focus such an aspect and improve an error resistance.

Reference documents include a Laid-Open Japanese Patent Application Publication Nos H09-179838 and a Registered Japanese Patent No. H07-82479.

SUMMARY OF THE INVENTION

The purpose of the present invention is to provide a technique for improving an error resistance of a computer (i.e., a data processing apparatus) dualizing address crossbars.

A data processing apparatus according to a first aspect of the present invention is one enabling a system board equipped with one or more central processing units (CPU) and an input/output (IO) unit for connecting to a peripheral device as a unit to be capable of implementing, comprising: plural crossbars which are adopted for connecting between the units and which are operable in a plurality of modes; and a mode change unit for changing a mode setup of another crossbar influenced by an error occurring in one crossbar of plural crossbars from a first mode to a second mode for operating one crossbar independently in the case of operating the plural crossbars in the first mode for dualizing the crossbars.

The mode change unit is preferably configured to receive an error notification signal from a crossbar in which an error has occurred among the plural crossbars for notifying the error occurrence, and transmit, to other crossbars, a setup signal for changing from the first mode to the second mode, thereby changing the mode of the other crossbars.

The mode change unit is also preferably configured to make a crossbar in which an error has occurred, of the plural crossbars, transmit a signal for notifying the error occurrence to other crossbars, thereby accomplishing a mode change at the other crossbars.

A data processing apparatus according to a second aspect of the present invention is one, comprising: plural processing units, each of which is equipped with a processing unit; dualized plural crossbar units which are respectively connected to the plural processing units, which intervene in data transmission among the plural processing units and in which operation modes are changed over between a dualization mode and a singularized mode; and a mode change unit for sending an instruction to other crossbar units for changing an operation mode from the dualization mode to singularization mode.

A mode management apparatus according to the present invention is premised to be equipped in a data processing apparatus enabling a system board equipped with one or more central processing units (CPU) and an input/output (IO) unit for connecting to a peripheral device as a unit to be capable of implementing, comprising: a transmission/reception unit that is adopted for connecting between the units and that is capable of respectively transmitting and receiving to and from plural crossbars that are operable in a plurality of modes; and a mode control unit for making the transmission/reception unit transmit a setup signal for changing a mode setup of another crossbar influenced by an error from a first mode to a second mode for operating a crossbar independently, thereby changing a mode of the other crossbar if the transmission/reception unit receives an error notification signal notifying of the error occurrence from one of the plural crossbars which have been operating in the first mode for dualizing the crossbars.

A mode management method according to the present invention is one used for a mode management of a crossbar adopted, for connecting units, by a data processing apparatus enabling a system board equipped with one or more central processing units (CPU) and an input/output (IO) unit for connecting to a peripheral device as a unit to be capable of implementing, comprising: placing plural crossbars for connecting between units and operating the plural units in a first mode for dualizing the crossbars; and changing a mode setup of another crossbar influenced by an error occurring in one of the plural crossbars from the first mode to second mode for operating each of them independently.

The present invention is contrived to change a mode setup of other crossbars influenced by an error occurring in one of plural crossbars from a first mode to a second mode for operating each of them independently (i.e., in a singularization mode) in the case of placing plural crossbars (i.e., crossbar units) for connecting incorporated units (i.e., processing units) and operating the plural crossbars in the first mode (i.e., a dualization mode) for dualizing the crossbars.

In the first mode, a crossbar in which an error has occurred is made to stop operating from a standpoint of a reliability of data. In the second mode, only a part to be stopped is made to stop operating. Therefore, changing the mode of a crossbar, in which no error has occurred, from the first mode to second mode due to an error occurrence in another crossbar makes it possible to operate the system by using the normally operable parts even if an error occurs in a part of the system. This configuration enables an improvement of error resistance and an accomplishment of a higher availability of the system.

DESCRIPTION OF THE PREFERRED EMBODIMENTS

The following is a detailed description of the preferred embodiment of the present invention by referring to the accompanying drawings.

Figure 3:
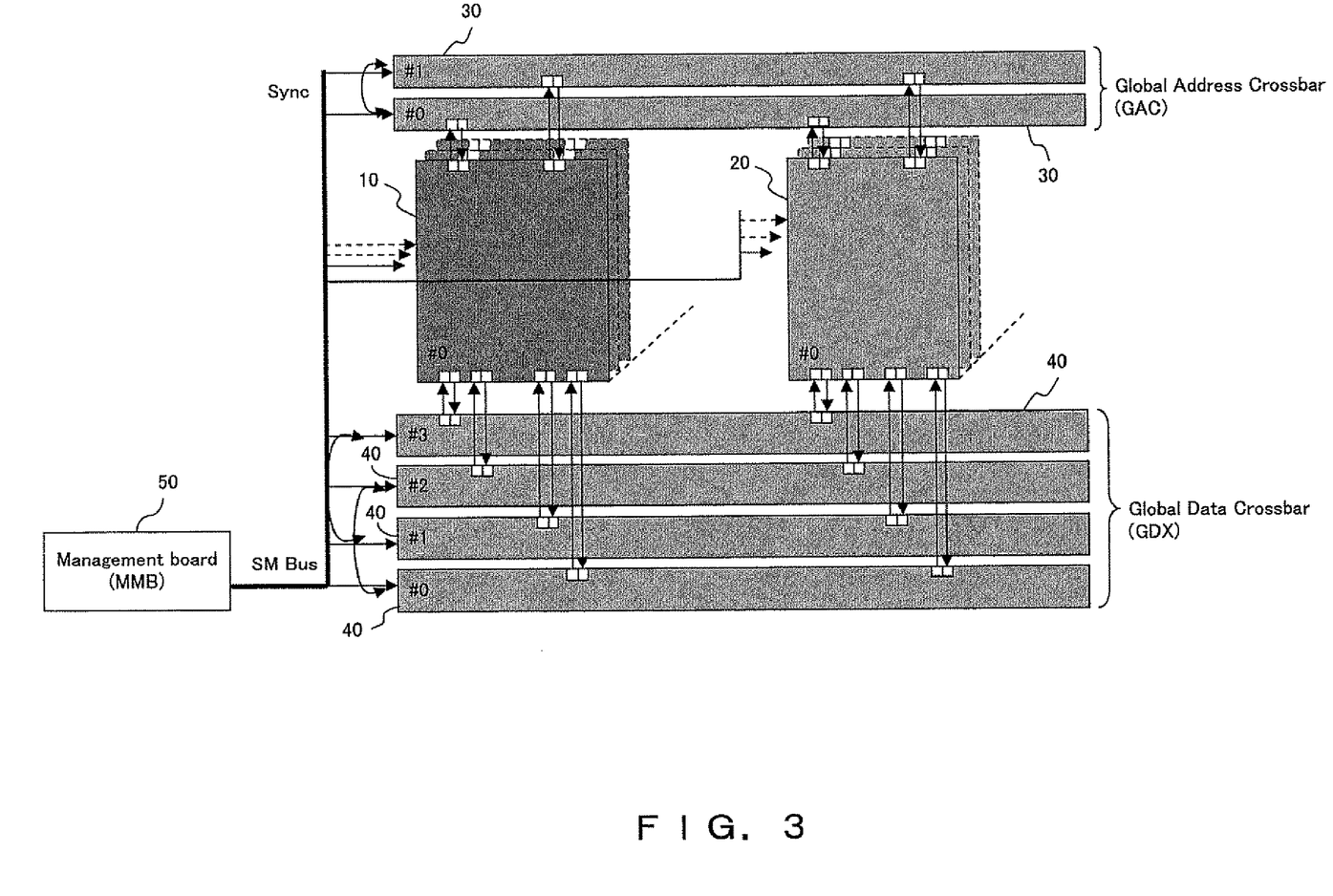
FIG. 3 is a diagram showing a configuration of a data processing apparatus (i.e., a computer) according to the present embodiment.

FIG. 3 is a diagram showing a configuration of a data processing apparatus (i.e., a computer) according to the present embodiment. As shown in FIG. 3, one or more system boards 10 and an IO unit 20 are both connected to two global address crossbars (abbreviated as "address crossbar" or "GAC" hereinafter) 30 and four global data crossbars (abbreviated as "data crossbar" or "GDX" hereinafter) 40, respectively. A management board (MMB) 50 is a dedicated management unit that is connected to each of the unit 10 through 40 by way of an SM bus.

The address crossbars 30 are dualized and two address crossbars 30 simultaneously perform the same request control, thereby accomplishing a high reliability. The reason for providing four data crossbars 40 is that a large amount of data is usually transmitted at once. The two address crossbars 30 operate synchronously with each other. As for the data crossbars 40, the two data crossbars 40#0 and 40#2, two data crossbars 40#1 and 40#3 operate synchronously with each other, respectively.

Figure 4:
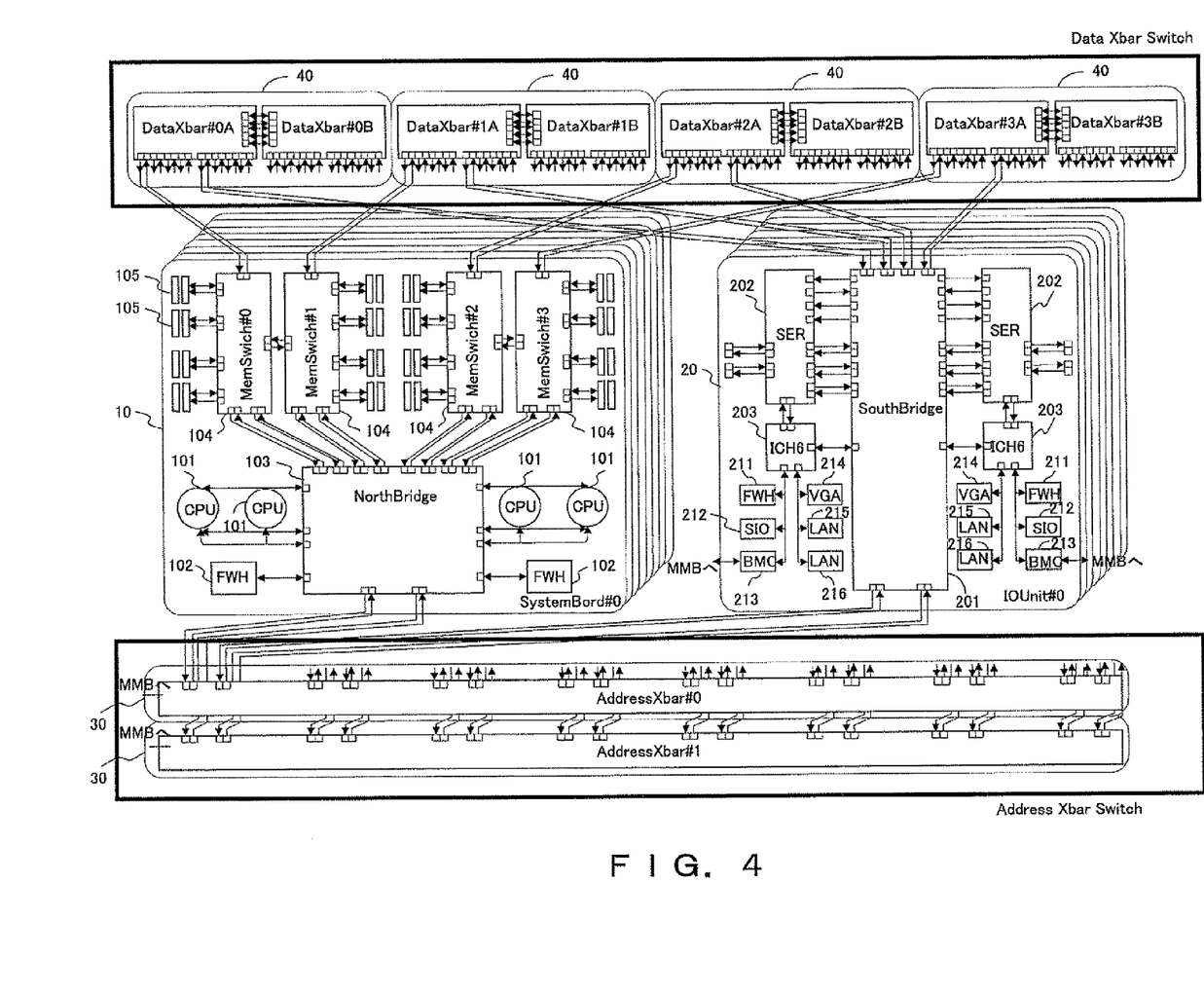
FIG. 4 is a diagram showing an example of configuration of a system board 10 and an IO unit 20.

FIG. 4 is a diagram showing an example of configuration of the system board 10 and IO unit 20.

The system board IO comprises four CPUs 101, two Firm Ware Hub (FWH) 102, a North Bridge 103, four memory switches (noted as "Mem Swich" in the drawing) 104 and plural pieces of memory 105 connected to the respective memory switches 104. The IO unit on the other hand comprises a South Bridge 201, a PCI device connected to two SER 202 and PCI port that are connected to the South Bridge 201, an ICH6 203 connected to each SER 202 and a South Bridge 201, and six controllers 211 through 216 connected to each ICH6 203. The ICH6 203 is an I/O controller hub. The controllers 211 through 216 shown in FIG. 4 are examples, and the kind and the number of them are discretionary. These may be arbitrarily determined by the unit of IO unit 20.

The South Bridge 201 of the IO unit 20 is connected to two address crossbars 30 and four data crossbars 40, respectively. The South Bridge 201 controls the individual controllers 211 through 216 by way of the SER 202 and ICH6 203. If there is write data sent from the PCI for example, a request is issued from the South Bridge 201 to the address crossbar 30. Receiving transmitted data from the system board 10 by way of the data crossbar 40, the data is sent out to a controller and PCI which are to be sent to by way of the SER 202 and ICH6, so that data is stored, output or transmitted thereby.

The four CPUs 101 mounted on the system board 10 issue, to the North Bridge 103, a read/write command for reading and writing from and to the memory 105, another system board 1b0 or IO unit 20. The North Bridge 103 once stores the commands input from the respective CPU 101, selects one of them in accordance with a priority order, issues it as a request (i.e., an address request) and outputs it to the address crossbar 30 and four memory switches 104, respectively.

The data transmitted by way of the data crossbar 40 is received at the memory switch 104, output to the North Bridge 103 and handed over to a CPU 101 in need of the data via the North Bridge 103. The data to be transmitted to other system boards 10 or IO units 20 is transmitted and transferred to the data crossbar 40 via the memory switch 104.

In the mechanisms, such as memory, buffer and queue which are incorporated in the address crossbar 30 for accumulating data and control information, an Error Correcting Code (ECC) or parity is added. The configuration is such as to recognize an occurrence of an uncorrectable error by the addition. Also configured is to recognize an occurrence of an error such as freeze by monitoring operations of other parts. The present embodiment is configured to respond to, when an error occurs during an operation in the dualization mode, as follows. Accordingly the next is a description of this aspect by referring to FIGS. 5 through 8.

Figure 5:
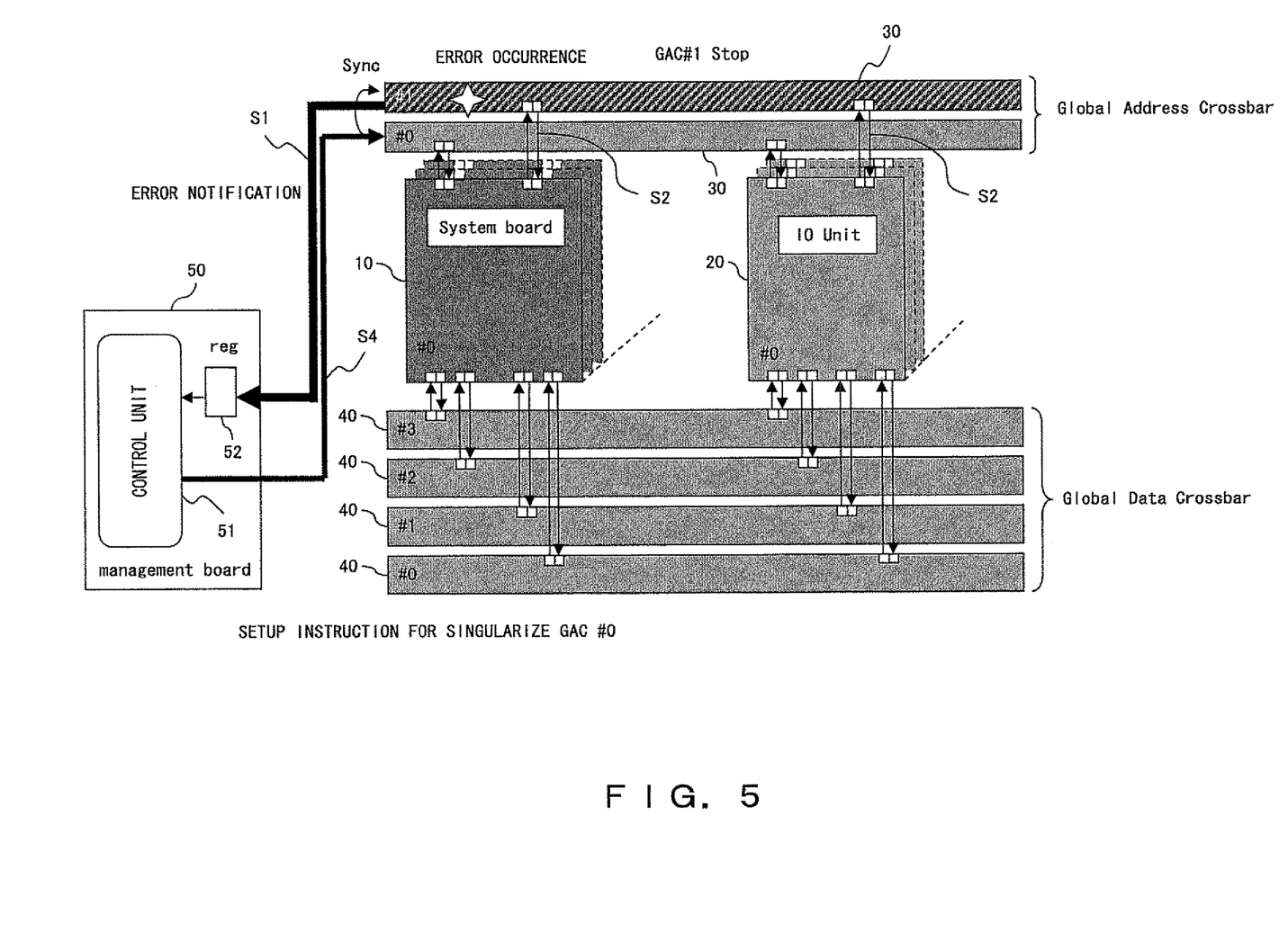
FIG. 5 is a diagram showing a signal transmitted and received at an error occurrence.

FIG. 5 is a diagram showing a signal transmitted and received at an error occurrence. FIG. 5 shows the case of an error occurrence in the address crossbar 30#1. The following description accordingly assumes the case of an error occurrence in the address crossbar 30#1.

The address crossbar 30#1 in which the error has occurred transmits an error notification signal S1 to the management board 50 for notifying of the event, and transmits a GAC #1 separation signal S2 to each system board 10 and each IO unit 20 for requesting for separating the address crossbar 30#1 per se from the system.

The information transmitted as an error notification signal S1 to the management board 50 is stored in a register 52. Having validated the error occurrence in the address crossbar 30#1 by the information stored in the register 52, a control unit 51 of the management board 50 generates and transmits a setup signal S4 to the address crossbar 30#0, in which no error has occurred, so as to change the mode from the dualization mode for dualization to the singularization mode for operating it independently. Having received the signal S4, the address crossbar 30#0 accordingly operates in the singularization mode thereafter.

Figure 8:
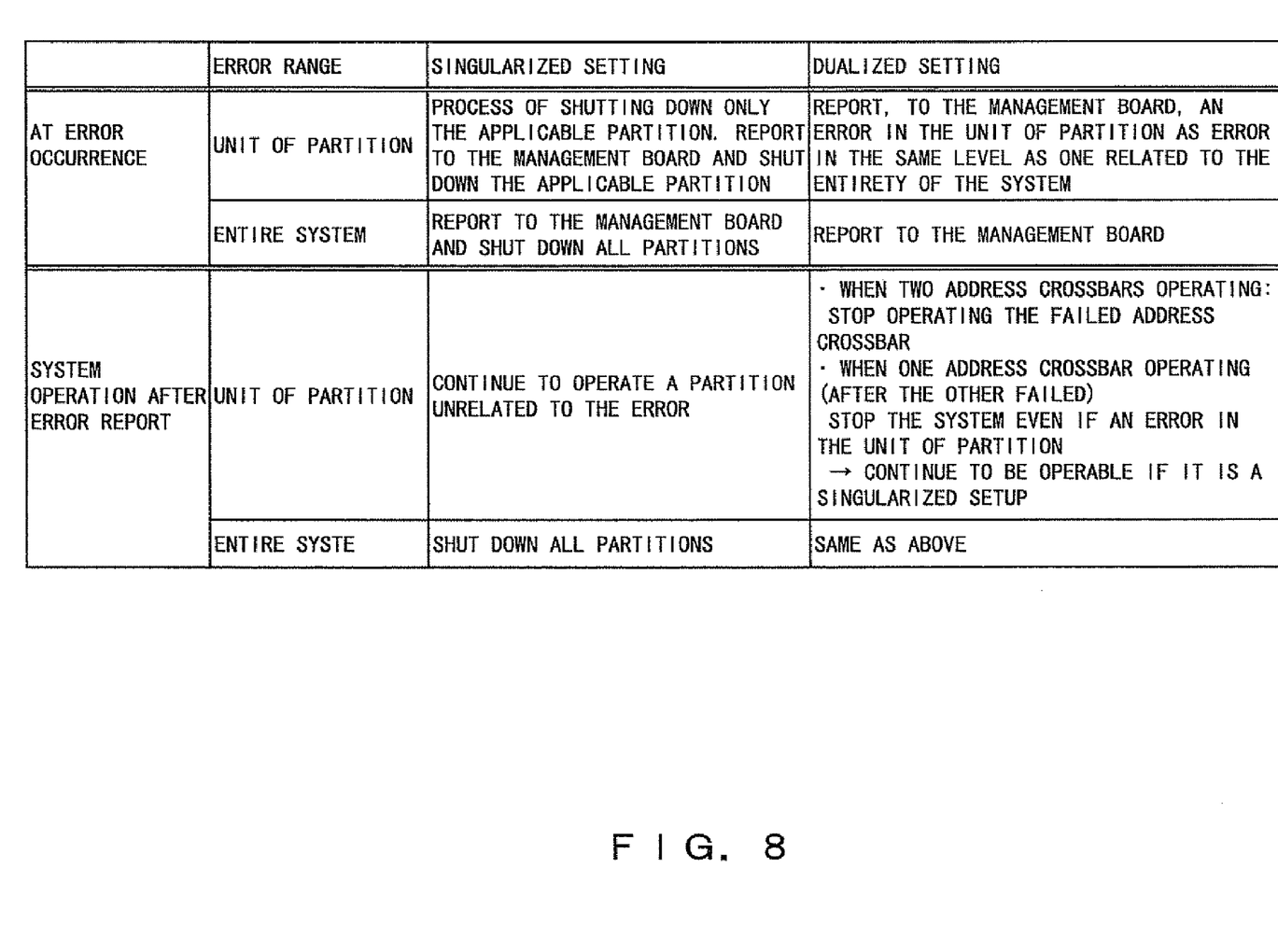
FIG. 8 is a diagram showing a response to an error influenced by a setup mode and an error occurrence.

FIG. 8 is a diagram showing a response to an error influenced by a setup mode and an error occurrence.

As shown in FIG. 8, the address crossbar 30 operating in the singularization mode is not made to stop operating unless an error influencing the entirety of the system occurs. If an error occurring is not as such, only a part related to a partition influenced by the error is made to stop (i.e. shut down), while the other parts are made to continue operations. If an error influencing the entirety of the system occurs, the address crossbar 30 reports the event to the management board 50 so as to stop the entirety of operations. Such a configuration avoids an unnecessary stoppage of operation, enabling a process-capable partition to continue performing the process. A stoppage (i.e., a shutdown) of the units 10 or 20 comprising a process-disabled partition is conducted by the management board 50.

Meanwhile, at the address crossbar 30 operating in the dualization mode, the entirety of the operation is made to stop regardless of a range of being influenced by the error. Therefore, an error resistance is improved as compared to the case of operating the address crossbar 30 in which no error has occurred in the dualization mode, thereby enabling an accomplishment of a higher availability of the system.

Figure 6:
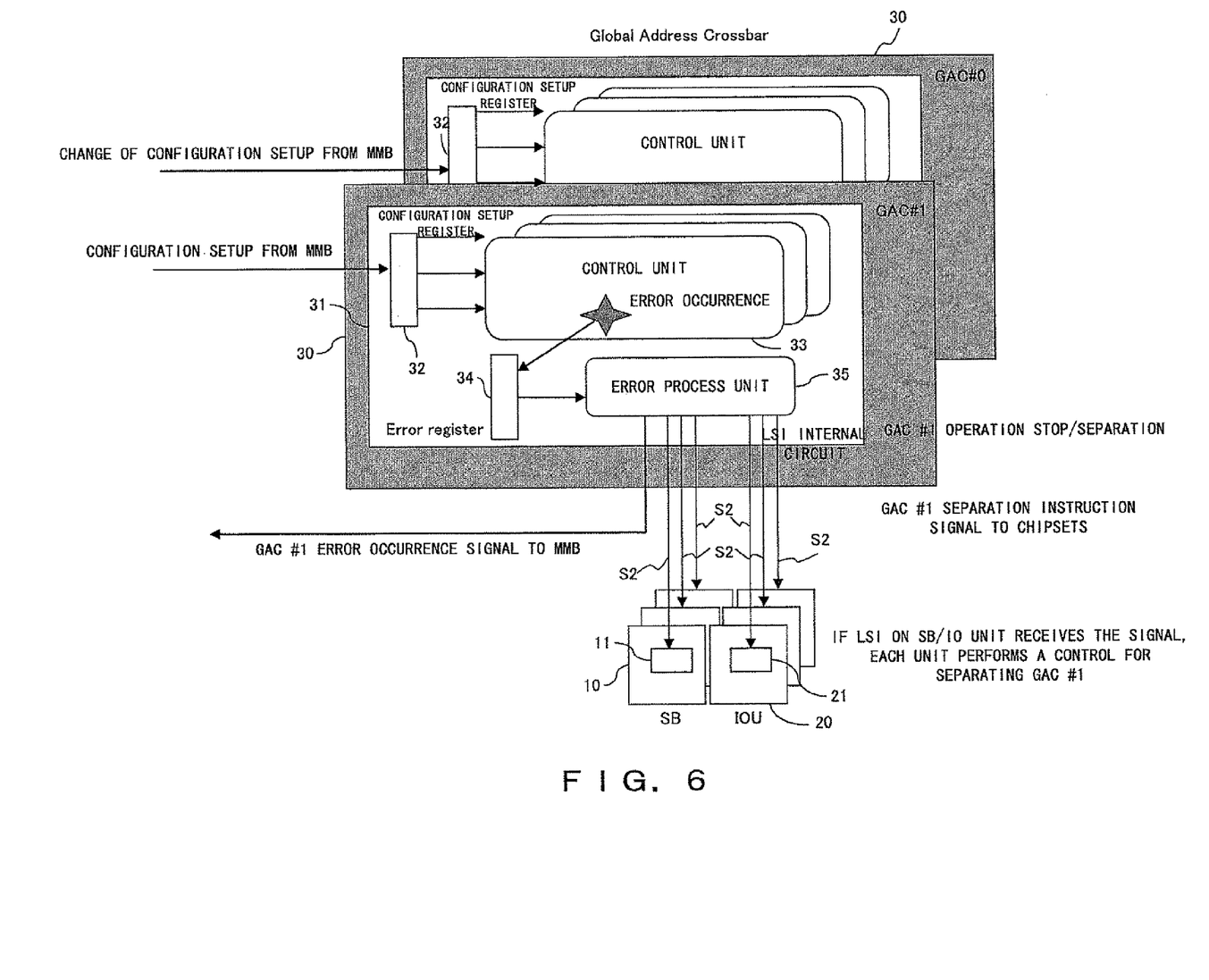
FIG. 6 is a diagram showing a configuration of an address crossbar 30.

FIG. 6 is a diagram showing a configuration of the address crossbar 30.

The address crossbar 30 is internally equipped with an LSI 31 in which incorporated are a configuration setup register 32, a plurality of control units 33, an error register 34 and an error process unit 35 as shown in FIG. 6. The configuration setup register 32 is a register for performing various setup changes that are carried out by rewriting a stored content. The individual control units 33 are for implementing communications between the respective corresponding units and are equipped with such as a plurality of error detection functions, a mediation circuit for selecting one of requests issued from the respective units 10 and 20, a communication circuit for implementing communications between units. Information related to an error detected by the error detection functions is stored in the error register 34. The error process unit 35 performs a process of responding to an occurring error based on information stored in the error register 34. The execution of the process achieves a transmission of an error notification signal S1 for notifying the error management board 50 of the occurring error and that of a separation instruction signal S2 to the respective units 10 and 20 for requesting for separation.

The separation instruction signal S2 is transmitted to LSIs 11 and 21 equipped in the respective units 10 and 20. The LSIs 11 and 21 respectively correspond to the North Bridge 103 and South Bridge 201 for example in the configuration shown in FIG. 4. The LSIs 11 and 21 receiving the separation instruction signal S2 results in separating the address crossbar 30 that has received the separation instruction signal S2.

Figure 7:
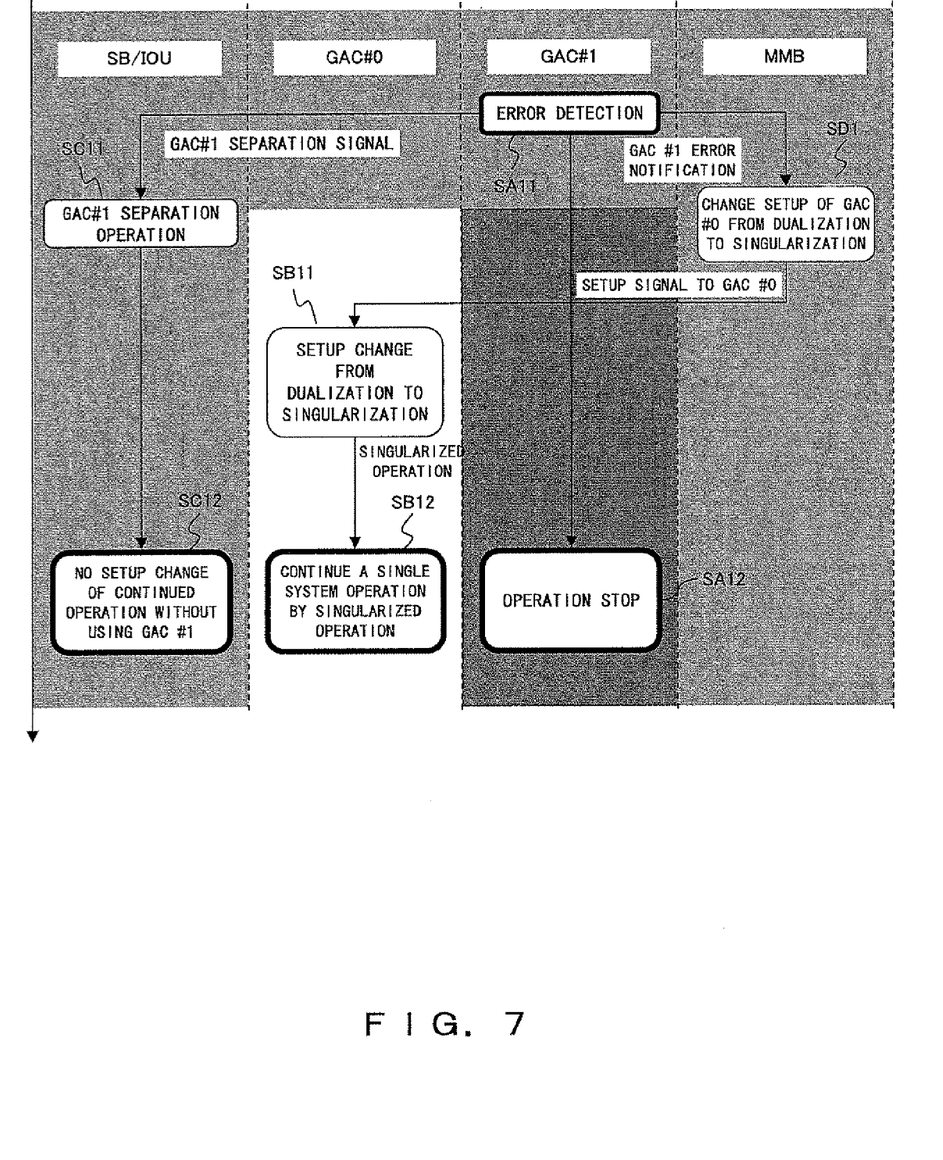
FIG. 7 is a flow chart showing a flow of process carried out by each part when an error occurs in an address crossbar 30#1.

FIG. 7 is a flow chart showing a flow of process carried out by each part when an error occurs in the address crossbar 30#1. The next is a specific description of an operation of each part including the crossbar 30#1 in which an error has occurred by referring to FIG. 7. Similar to the case of FIG. 2, the individual parts are divided into four parts, i.e., a system board 10 and IO unit 20 (noted as "SB/IOU" in the drawing), an address crossbar 30#0 (noted as "GAC #0" in the drawing), an address crossbar 30#1 (noted as "SAC 3#1" in the drawing) and a management board 50 (noted as "MMB" in the drawing).

When either of the control units 33 recognizes (i.e., detects) an error occurrence, the address crossbar 30#1, the error process unit 35 respectively transmits an error notification signal S1 to the management board 50, and an error separation instruction signal S2 (noted as "GAC separation signal" in the drawing) to each system board 10 and each IO unit 20 (SA 11) in the address crossbar 30#1. It is followed by stopping the operation (SA 12).

The LSIs 11 and 21 equipped in the respective units 10 and 20 perform operations (i.e., processes) for separating the address crossbar 30#1 from the system in response to receiving the GAC #1 separation instruction signal S2 (SC 11). The same operation continues thereafter except for not using the separated address crossbar 30#1 (SC 12).

When the control unit 52 receives an error notification signal S1 by way of the register 52, the management board 50 determines a change of mode setup of the address crossbar 30#0, in which no error has occurred, from the dualization mode to the singularization mode, and generates and transmits a setup signal S4 for the change to the address crossbar 30#0 (SD 11).

The setup signal S4 transmitted to the address crossbar 30#0 is stored in the configuration setup register 32 so that each control unit refers to the content thereof and changes the mode setup from the dualization mode to singularization mode (SB 11). By this, each control unit continues to operate in the singularization mode thereafter (SB 12).

Figure 9:
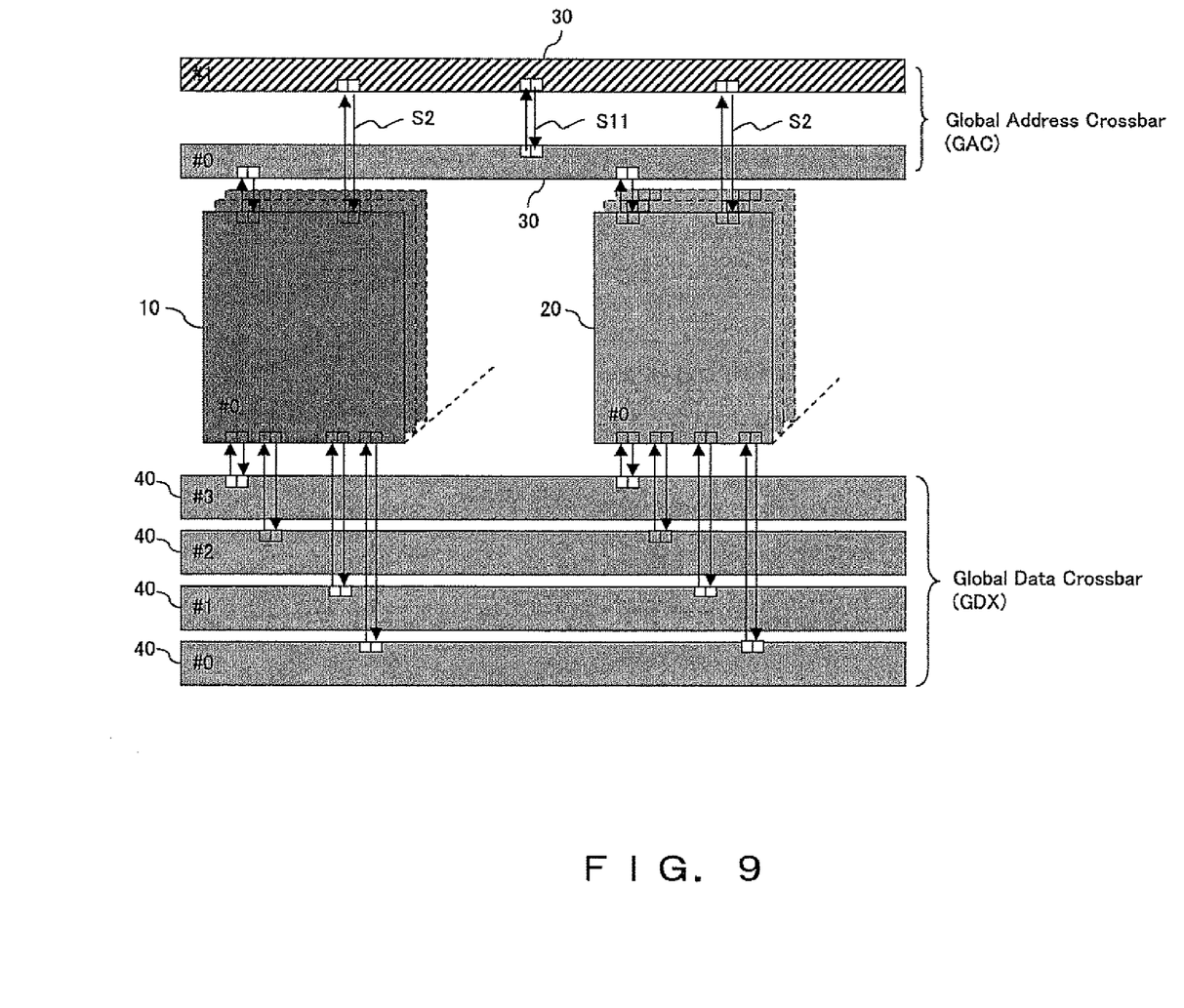
FIG. 9 is a diagram showing another method for accomplishing a mode change in an address crossbar 30 in which no error has occurred (part 1)
Figure 10:
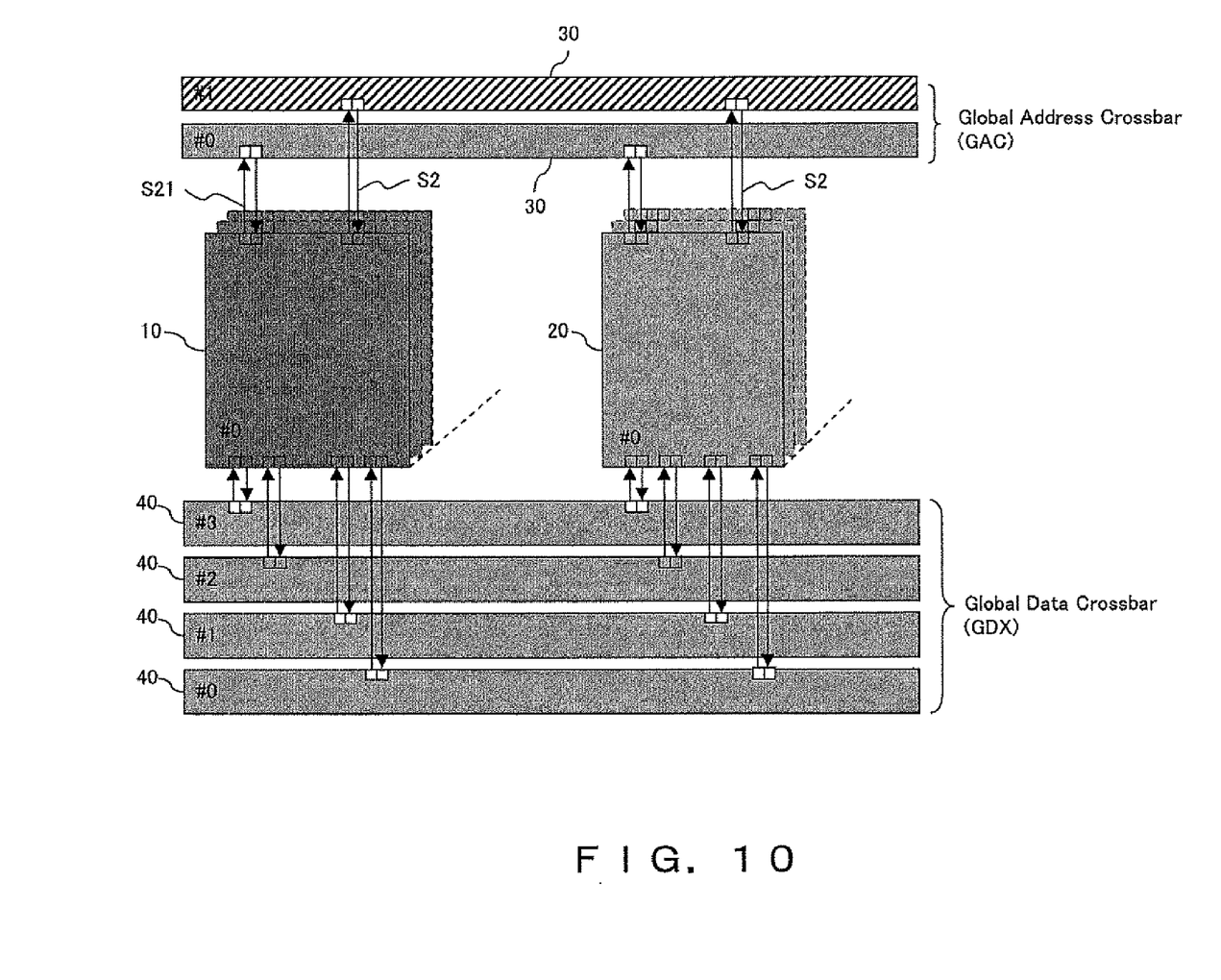
FIG. 10 is a diagram showing another method for accomplishing a mode change in an address crossbar 30 in which no error has occurred (part 2).

Note that the present embodiment is configured such that the management board 50 carries out a mode change of the other crossbar 30 if an error occurs in one of the dualized address crossbar 30 because the management board 50 is enabled to carry out a communication with the individual unit 10 through 40. That is, the management board 50 is capable of responding while a change of specification is suppressed. Such a mode change, however, may be accomplished by a method not using the management board 50. An example configuration may be in a manner to enable a transmission and reception of a signal between two address crossbars 30 so that the address crossbar 30 in which an error has occurred (i.e., the address crossbar 30#1 herein) transmits an error occurrence notification signal S11 to the other address crossbars 30 (i.e., the address crossbar 30#0 herein), thereby making the address crossbar 30 that has received the signal S11 as shown in FIG. 9. An alternative configuration may be in a manner to make for example a system board 10 which has received a separation instruction signal S2 transmit a signal 21 to a normal address crossbar 30 which has transmitted no instruction signal S2 for notifying that an error has occurred in another address crossbar 30, thereby achieving a mode change as shown in FIG. 10. The system board 10 or IO unit 20 to which the signal S21 is transmitted may be predetermined a priority order for example so as to select the highest priority order from among the units operating normally. A dedicated unit for a mode change of the address crossbar 30 may be provided so as to implement a mode change by way of the dedicated unit.

Meanwhile, the present embodiment is configured to dualize the address crossbar 30; it is, however, conceivable to adopt a triplex or, moreover, multiplex. In the case of adopting a multiplex, only required is to carry out a mode change of an address crossbar in which no error has occurred under the condition of inability to operate in more than a dualization for example. A unit interconnected by an address crossbar 30 is not limited to the system board 20 or IO unit 20. The category and combination may be discretionarily changed.

What is claimed is:

1. A data processing apparatus operably coupled to a system board equipped with one or more central processing units (CPU) and an input/output (IO) unit for connecting to a peripheral device, the data processing apparatus comprising:
   a plurality of crossbars to connect between the processing units, the plurality of crossbars being operable in a plurality of modes; and
   a mode change unit to change a mode setup of a first crossbar influenced by an error occurring in a second crossbar of the plurality of crossbars from a first mode to a second mode, the first mode being a dualization mode and the second mode being a mode in which the first crossbar and the second crossbar operate independently; wherein
   when an error occurs in the second crossbar, the second crossbar transmits a signal for notifying the error occurrence to the mode change unit and the mode change unit instructs the first crossbar to change from the first mode to the second mode.

2. A mode management apparatus to be equipped in a data processing apparatus operably connected to a system board equipped with one or more central processing units (CPU) and an input/output (IO) unit for connecting to a peripheral device, the mode management apparatus comprising:
   a transmission/reception unit to respectively transmit and receiving receive to and from plural crossbars that are operable in a plurality of modes and that connect between processing units; and
   a mode control unit to make the transmission/reception unit transmit a setup signal for changing a mode setup of a first crossbar influenced by an error occurrence in a second crossbar from a first mode to a second mode, thereby changing a mode of the first crossbar, the first mode being a dualization mode and the second mode being a mode in which the first crossbar and the second crossbar operate independently; wherein
   said transmission/reception unit transmits the error notification signal from the second crossbar to the mode control unit.

3. A method used for a mode management of a crossbar for connecting processing units, by a data processing apparatus operably connected to a system board equipped with one or more central processing units (CPU) and an input/output (IO) unit for connecting to a peripheral device, the method comprising:
   using plural crossbars for connecting between plural processing units, the plural crossbars operating in a first mode or a second mode, the first mode being a dualization mode and the second mode being a mode in which the plural crossbars operate independently; and
   changing a mode setup of a first crossbar influenced by an error occurring in a second crossbar of the plural crossbars from the first mode to the second mode; wherein said changing is realized by, the second crossbar in which the error occurrence has occurred transmitting a signal for notifying the error occurrence to the first crossbar.

4. A data processing apparatus, comprising:

plural processing units;

dualized plural crossbar units which are respectively connected to the plural processing units, which intervene in data transmission among the plural processing units and in which operation modes are changed over between a dualization mode and a singularization mode; and a mode change unit to receive an error notification from a crossbar unit having an error occurrence and to send an instruction to another crossbar unit for changing an operation mode from the dualization mode to singularization mode.

* * * * *